UNITED STATES PATENT OFFICE.

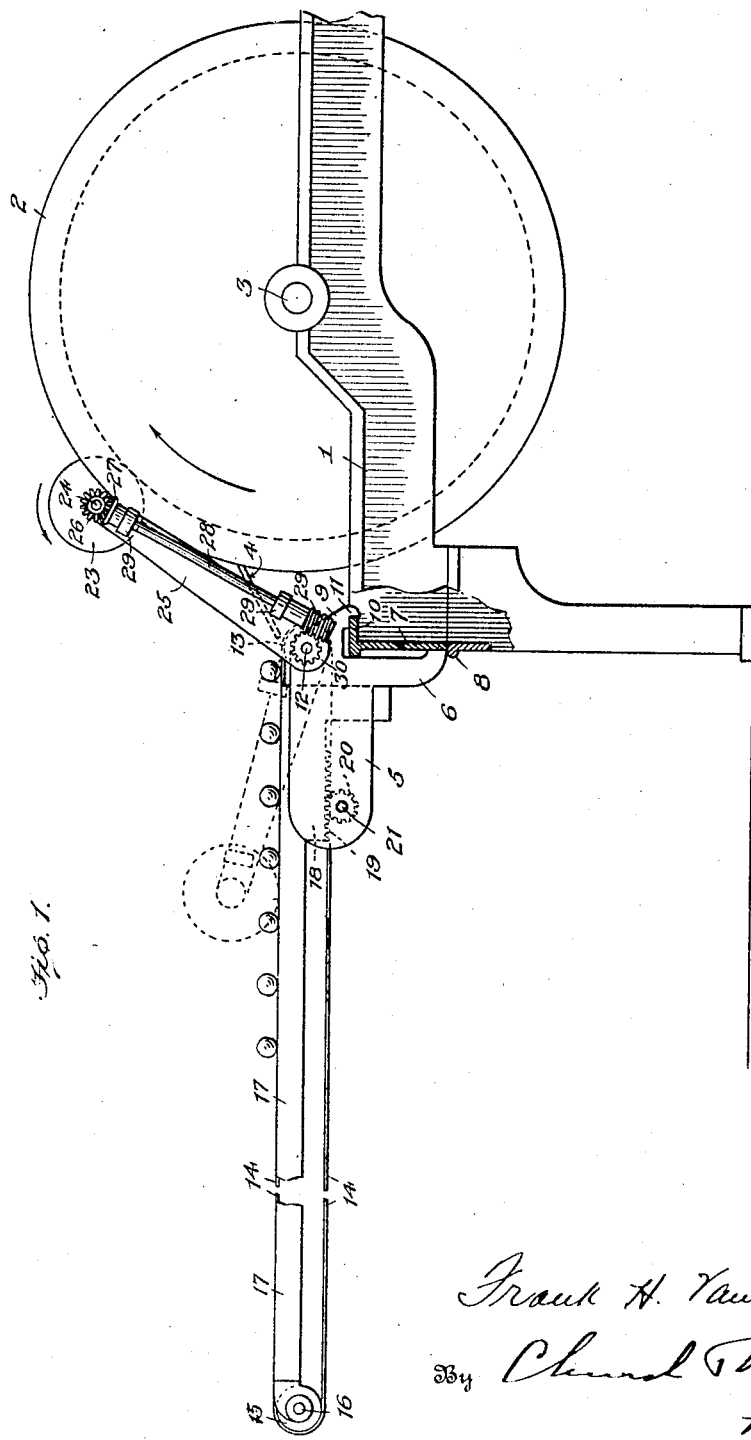

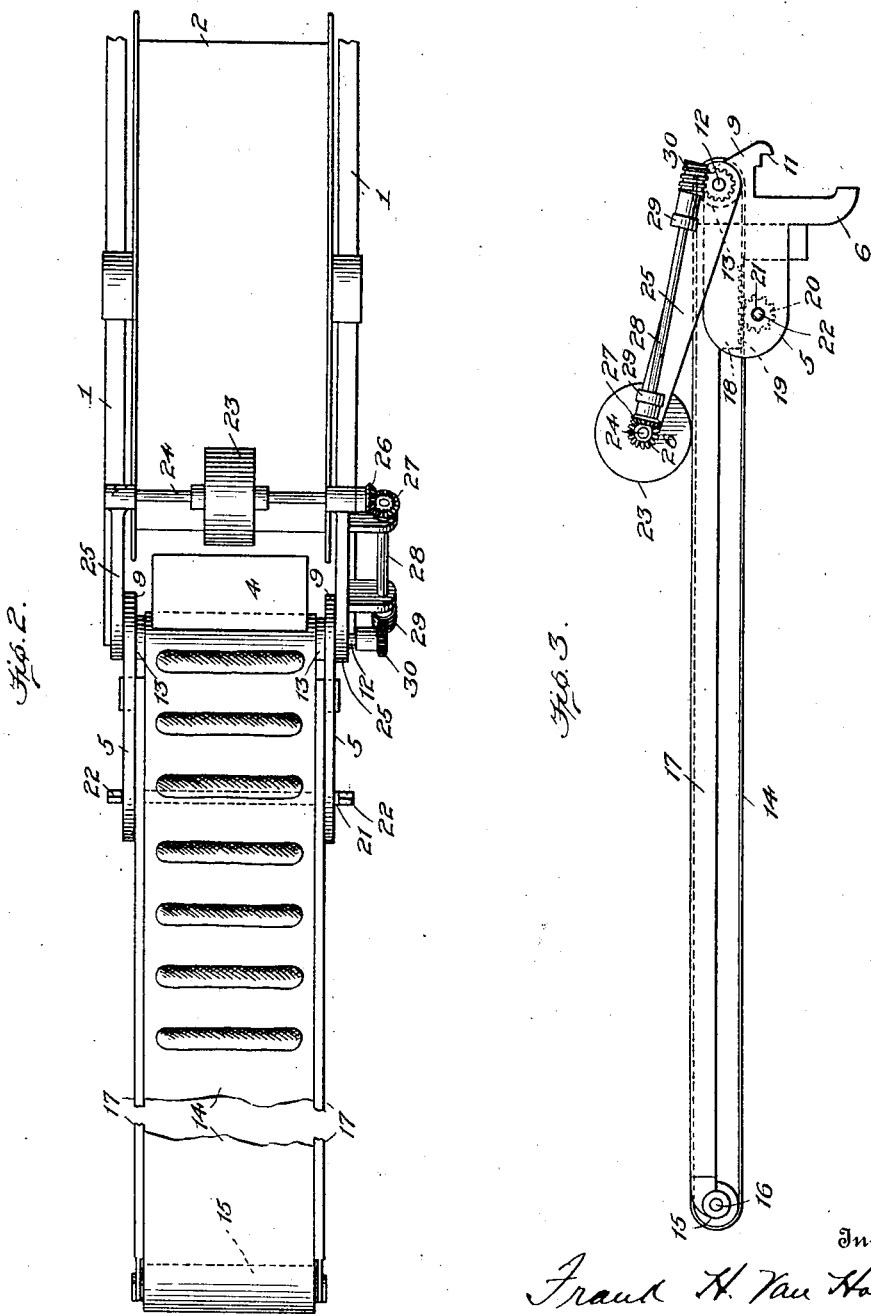

FRANK H. VAN HOUTEN, OF BEACON, NEW YORK, ASSIGNOR TO DUTCHESS TOOL COMPANY, OF BEACON, NEW YORK, A CORPORATION OF NEW YORK.

ATTACHMENT FOR DOUGH-MOLDING MACHINES.

1,333,885.    Specification of Letters Patent.    Patented Mar. 16, 1920.

Application filed January 21, 1918. Serial No. 212,900.

*To all whom it may concern:*

Be it known that I, FRANK H. VAN HOUTEN, a citizen of the United States, residing at Beacon, in the county of Dutchess and State of New York, have invented certain new and useful Improvements in Attachments for Dough-Molding Machines; and I do hereby declare the following to be a full, clear, and exact description of the same, reference being had to the accompanying drawings, forming part of this specification.

This invention relates to dough conveyers for attachment to molding machines of the type in which a molding drum is used.

The object of this invention is to obtain a convenient fixture for attachment to a dough molding machine for the purpose of keeping the rolls of dough separated until placed in the baking pan.

A further object of the invention is to provide a belt carrier that can be readily attached or detached to the molding machine. A further object of the invention is to provide a separate attachment which may be lifted from a dough molding machine and one in which a friction roll, adapted to be thrown into and out of contact with the molding drum, drives the belt-carrier.

In the drawings,—

Figure 1 is a side elevation of my device shown attached to an ordinary molding machine;

Fig. 2 is a plan view of the structure shown in Fig. 1; and

Fig. 3 is a fragmentary view of my device with the friction wheel thrown back upon the table.

In the drawings, 1 represents the frame of an ordinary dough-making machine such as is illustrated in the patent to C. A. Thomson, No. 701,646, dated June 3, 1902. Upon this frame is pivoted a molding drum 2 mounted on an axle 3 and turning in the direction indicated by the arrow. In a machine of this type, lumps or measured parts of the dough are successively placed in the machine and the latter then automatically forms the dough first into a sheet, then rolls the same up into spiral form, and finally works the spiral roll into a longitudinal roll, ready for insertion in the pan. The molding wheel rolls these pieces of dough against a flexible shield (not shown), and finally delivers the dough to the incline 4, the usual method being to allow the rolls of dough to pass from this incline down a further incline and to accumulate at the bottom, but by this method the accumulated dough rolls stick together and cause a lot of trouble, and it is to avoid such trouble that the present invention is designed.

The dough carrier of my invention includes two side plates 5 each provided with a lower leg 6 adapted to press against the front frame 7 of the molding machine, just above the raised beading 8, usual in machines of this type. An upper leg 9 on each plate 5 overhangs the flat horizontal surface 10 of the molding machine and by a shoulder 11 rigidly holds the carrier in place. In the plates 5 is journaled an axle 12 carrying a roller 13 which furnishes a support for one end of an endless belt 14, the other support being provided by the roller 15 mounted on an axle 16 rotatably mounted in the two arms 17 slidably carried by the frame made up of the side plates 5.

One of the arms 17 (or both if desired) has an enlarged portion 18, at the end next to the plates 5, the lower end of this enlarged portion being provided with teeth 19 forming a rack which coöperates with a toothed wheel 20 on shaft 21, journaled through the plates 5 for the purpose of regulating the tension of the endless belt 14 by varying the distance between the rollers 13 and 15. The ends of the axle 21 are squared as at 22 to permit of the turning of the shaft by means of an ordinary wrench.

Power is supplied to the endless belt by means of a friction wheel 23 on a shaft 24 rotatably mounted in casing arms 25 pivotally supported on the shaft 12 in such manner that the casing arms may be thrown away from the drum so as to permit the friction wheel 23 to rest upon the table formed by the belt 14. The shaft 24 carries at one end a bevel gear 26 meshing with a similar gear 27 on a shaft 28 journaled in projections 29 carried by one of the casing arms 25. The shaft 28 carries a worm 29 on the end remote from the bevel gear 27, this worm coöperating with a worm wheel 30 secured to the shaft 12 which drives the belt by means of the roller 13.

The dough carrying fixture can readily be detached from the machine by raising the plates 5 until the shoulders 11 clear the front frame of the machine, the casing arms 25 at such time being preferably thrown on their axis 12 so as to permit all of the parts carried thereby to rest directly on the table formed by the belt of the endless carrier.

In use the molding drum rolls the batches of dough at regular intervals and delivers them by the incline 4 to the endless belt 14, and since this belt is being driven by contact of the friction roll 23 against the drum 2, the rolls of dough will be distributed at equal distances on the belt and are taken from such belt and placed in pans for baking, thus obviating all of the difficulty caused by the rolls of dough sticking together, as is the case when my attachment is not used.

What is claimed is:

1. The combination with a dough molding machine of the type in which a drum is employed, of a manually detachable conveyer frame, an endless belt mounted therein, and means movable into and out of contact with the molding drum for operating the endless belt.

2. The combination with a drum type dough molding machine, of a manually detachable conveyer frame, an endless belt mounted therein, and means operated by the turning of the molding drum for moving the endless belt, said means including a pair of arms pivotally carried by said frame, and a friction roll engageable with the drum surface mounted at the extremity of said arms.

3. The combination with a dough molding machine of the type in which a drum rolls the flattened sheets of dough into spiral rolls, of a detachable conveyer frame, an endless belt mounted therein, a pair of arms pivotally mounted in said frame and carrying at one extremity thereof a friction wheel adapted to rest against the drum in one position and against the endless belt in another position, and means connecting the friction roll and said endless belt whereby said belt is driven when the roll is in contact with the drum.

4. The combination with a dough molding machine of the type in which a dough rolling drum is employed, of conveyer mechanism for maintaining the dough balls separated from each other when discharged from the drum, and means operated by the drum surface for causing such movement of the conveyer mechanism.

5. In an attachment for machines employing a rotary drum, a conveyer frame, fixed means carried by said frame for securing the attachment to said machine, an endless conveyer belt carried by said frame, and means pivoted to said frame and operated by the surface of the drum for driving said belt.

6. In a conveyer structure, a frame, a roller, a shaft on which said roller is mounted, a pinion on said shaft, and means pivotally mounted on said shaft and meshing with said pinion for driving said roller when said pivotal means is in one position and for rendering the device inoperative when in another position, a second roller, and an endless belt mounted on said rollers and providing a support for said pivotal means when in inoperative position.

FRANK H. VAN HOUTEN.